UNITED STATES PATENT OFFICE.

EDWIN J. TOOF, OF FORT MADISON, IOWA.

IMPROVED THREE-HORSE DRAFT-EQUALIZER.

Specification forming part of Letters Patent No. 51,632, dated December 19, 1865.

*To all whom it may concern:*

Be it known that I, EDWIN J. TOOF, of Fort Madison, in the county of Lee and State of Iowa, have invented a new and useful Improvement in Three-Horse Draft-Equalizers; and I do hereby declare that the following is a full, clear, and exact description of the same, reference being had to the accompanying drawing and the letters and figures marked thereon, which form part of this specification.

It is often desirable, in the case of gang-plows, harvesters, and other machines and vehicles requiring a heavy draft, that three horses should be arranged abreast of each other, in which case two horses must be placed upon one side of the guide or draft pole, while one only is placed upon the other side, which arrangement, by ordinary draft attachments, renders the draft very unequal and prevents the successful employment of horses in the manner proposed.

My invention consists in a novel and simple arrangement of levers of suitable proportions, whereby the draft is so applied to a short lever or double-tree, one of the arms of which is twice as long as the other, that the two horses arranged upon one side of the guide or draft pole draw upon the shorter arm of said short double-tree or lever, while the one horse upon the opposite side of the draft pole or guide draws upon the longer arm of said short double-tree, thus keeping a uniform and equal draft upon both sides.

To enable those skilled in the art to understand how to construct and use my invention, I will proceed to describe the same with particularity, making reference in so doing to the aforesaid drawing, in which—

Figure 1:
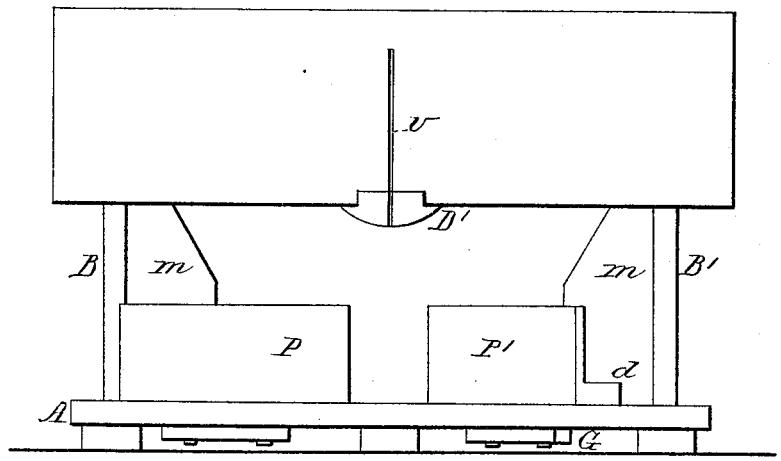
Figure 2:
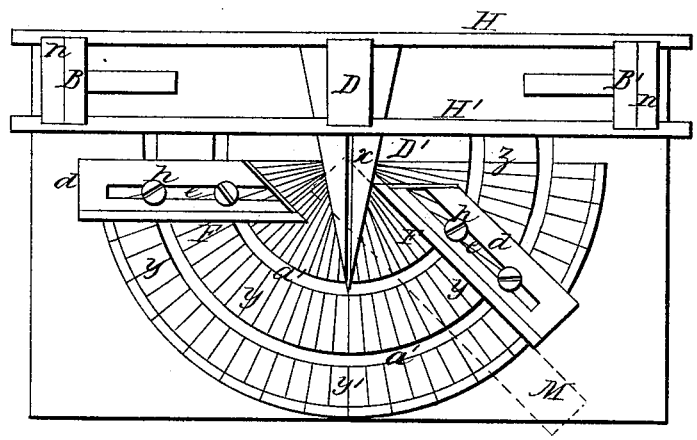

Figure 1 is a plan or top view of my invention.

A represents the guide or draft pole, which may be attached at its rear end to the machine or vehicle in any suitable manner.

B represents a short double-tree or lever, about eighteen inches, or thereabout, in length, pivoted to the draft pole or guide at $a$, at such a point on the lever as to make the arm $a\,c$ twice the length of the arm $a\,b$.

At a suitable distance in front of the point $a$ the levers C and D are pivoted to the draft pole or guide at $d$, as shown, which is the point at which double-trees are usually attached. The lever C is designed to be of such length as that one horse attached to the outer end thereof at $e$ may have room to work freely by the draft-pole. The lever D, to the outer end of which two horses are attached at $h$, should be twice as long as the lever C.

The points $f$ and $g$, at which the rods or chains $c\,f$ and $b\,g$ respectively connect the arms of the lever B to the levers C and D, are taken at such positions that the arms of said levers are proportional to each other, as follows: The arm $e\,f$ is to the arm $f\,d$ as the arm $h\,g$ is to the arm $g\,d$, so that no advantage is gained by the two horses, on account of the lever to which they are attached being longer than that to which the single horse is attached, said levers, by means of the connecting-rod $c\,f$ and $b\,g$, serving merely as an arrangement for attaching the horses to the short double-tree B without affecting the requisite relations between the power to be applied and the arms of the lever B, as herein set forth. By this arrangement it will be observed that the long arm of the lever B becomes the short arm in the levers C and D, while the short arm of said lever B becomes the long arm in the levers C and D, so that the two horses are attached to the short arm of the lever B and the one horse to the long arm of the same, and the proportions between said arms being as two to one, the extra length of the arm on the one hand compensates for the extra horse on the other, and thus an equipoise is secured in the draft and the double-tree or lever B, and the auxiliary levers C and D are kept in the proper position with respect to the guide or draft pole, as desired.

The exact proportions herein specified may be varied to accommodate the herein described arrangement to the varied powers of different horses.

The point $a$, which serves as the fulcrum for the short double-tree or lever B, may be either in the draft-pole, or any part of the machine or vehicle to which the invention may be applied.

The short lever C, to which the single horse is attached, may be pivoted to the guide or draft pole either before or behind the point at which the lever D, to which the two horses are attached, is pivoted thereto; or, if it is desired to give the one horse, still greater advantage

G. Trimble,
Mitering Machine,

Nº 51,633. Patented Dec. 19, 1865.

Witnesses:
Wm Albert Steel
W R Delany.

Inventor:
George Trimble
By his Atty
Henry Howson